(12) United States Patent
Gilde et al.

(10) Patent No.: US 12,401,165 B2
(45) Date of Patent: Aug. 26, 2025

(54) BATTERY PACK POWER TRANSFER ADAPTOR

(71) Applicant: BLACK & DECKER INC., New Britain, CT (US)

(72) Inventors: Philip Gilde, Baltimore, MD (US); Michael Varipatis, Fallston, MD (US); James Carucci, Towson, MD (US); Steven J. Phillips, Ellicott City, MD (US); Nicholas Rice, Baltimore, MD (US)

(73) Assignee: BLACK & DECKER INC., New Britain, CT (US)

( * ) Notice: Subject to any disclaimer, the term of this patent is extended or adjusted under 35 U.S.C. 154(b) by 64 days.

(21) Appl. No.: 18/354,176

(22) Filed: Jul. 18, 2023

(65) Prior Publication Data

US 2023/0361519 A1 Nov. 9, 2023

Related U.S. Application Data

(62) Division of application No. 17/237,929, filed on Apr. 22, 2021, now Pat. No. 11,705,683.

(60) Provisional application No. 63/013,909, filed on Apr. 22, 2020.

(51) Int. Cl.
*H01R 31/06* (2006.01)
*H02J 7/00* (2006.01)

(52) U.S. Cl.
CPC .......... *H01R 31/065* (2013.01); *H02J 7/0042* (2013.01); *H02J 2207/20* (2020.01); *Y02E 60/10* (2013.01)

(58) Field of Classification Search
CPC ...... H01R 31/065; H02J 7/0042; H02J 7/342; H02J 7/0063
See application file for complete search history.

(56) References Cited

U.S. PATENT DOCUMENTS

| | | |
|---|---|---|
| 5,162,719 A | 11/1992 | Tomura et al. |
| 5,721,481 A | 2/1998 | Narita et al. |
| 5,883,494 A | 3/1999 | Kobayashi et al. |
| 7,432,685 B2 | 10/2008 | Hayashi |
| 8,773,077 B1 | 7/2014 | Elmes et al. |
| 9,024,570 B2 | 5/2015 | Workman et al. |
| 9,093,848 B2 | 7/2015 | Miller et al. |
| 9,184,627 B2 | 11/2015 | Huang et al. |
| 9,287,730 B2 | 3/2016 | Miller et al. |
| 9,312,706 B2 | 4/2016 | Workman et al. |
| 9,362,764 B2 | 6/2016 | Farkas et al. |

(Continued)

FOREIGN PATENT DOCUMENTS

| | | |
|---|---|---|
| CN | 110601279 A | 12/2019 |
| KR | 101926809 B1 | 12/2018 |
| WO | 2019144265 A1 | 8/2019 |

*Primary Examiner* — Michael C Zarroli
(74) *Attorney, Agent, or Firm* — Michael Aronoff

(57) ABSTRACT

A battery pack power transfer adaptor and a battery pack system that includes a battery pack adaptor. The adaptor enables a battery pack to provide high level power transfers to a variety of devices and to receive high level power transfers from a variety of power sources. The adaptor includes a battery pack interface to enable the adaptor to mechanically and electrically connect to the battery pack. The adaptor is able to transfer power at a variety of levels dependent upon the device to which it is attached.

10 Claims, 17 Drawing Sheets

(56) References Cited

U.S. PATENT DOCUMENTS

| | | |
|---|---|---|
| 9,412,532 B2 | 8/2016 | Duan et al. |
| 9,515,419 B2 | 12/2016 | Inskeep |
| 9,595,840 B2 | 3/2017 | Miller et al. |
| 9,601,938 B2 | 3/2017 | Huang et al. |
| 9,620,989 B2 | 4/2017 | Meoli |
| 9,843,208 B2 | 12/2017 | Inskeep |
| 9,893,543 B2 | 2/2018 | Miller et al. |
| 9,923,393 B2 | 3/2018 | Workman et al. |
| 9,973,016 B2 | 5/2018 | Miller et al. |
| 10,116,153 B2 | 10/2018 | Chen et al. |
| 10,181,735 B2 | 1/2019 | Byrne et al. |
| 10,283,817 B2 | 5/2019 | Barnett et al. |
| 10,404,079 B2 | 9/2019 | Meoli |
| 10,424,943 B2 | 9/2019 | Wang et al. |
| 10,529,973 B2 | 1/2020 | Yau |
| 10,581,257 B2 | 3/2020 | Miller et al. |
| 2004/0164711 A1 | 8/2004 | Hayashi |
| 2009/0085523 A1 | 4/2009 | Kim |
| 2009/0267562 A1 | 10/2009 | Guccione et al. |
| 2012/0249071 A1* | 10/2012 | Yang .................... H02J 7/0024 320/110 |
| 2013/0043827 A1 | 2/2013 | Weinstein et al. |
| 2014/0139175 A1 | 5/2014 | Gonzalez |
| 2015/0155726 A1 | 6/2015 | Duan et al. |
| 2016/0099588 A1 | 4/2016 | Bae et al. |
| 2016/0134144 A1 | 5/2016 | Miller et al. |
| 2016/0365742 A1 | 12/2016 | Baum et al. |
| 2017/0194806 A1 | 7/2017 | Inskeep |
| 2018/0241018 A1 | 8/2018 | Bailey et al. |
| 2018/0277804 A1 | 9/2018 | Lee et al. |
| 2018/0287400 A1 | 10/2018 | Gall et al. |
| 2018/0294662 A1 | 10/2018 | Polakowski et al. |
| 2018/0342883 A1 | 11/2018 | Inskeep et al. |
| 2019/0013686 A1 | 1/2019 | Ma et al. |
| 2019/0190299 A1* | 6/2019 | Mohamed ............... B60L 53/12 |
| 2019/0243435 A1* | 8/2019 | Chou ....................... H02J 1/14 |
| 2019/0305563 A1 | 10/2019 | Koki et al. |
| 2020/0106280 A1 | 4/2020 | Inskeep |
| 2020/0127467 A1 | 4/2020 | Li |
| 2020/0161607 A1 | 5/2020 | Penmetsa et al. |
| 2020/0395778 A1 | 12/2020 | Obie et al. |
| 2021/0281085 A1 | 9/2021 | Lee et al. |
| 2021/0408806 A1 | 12/2021 | Stanke et al. |
| 2022/0385225 A1* | 12/2022 | Seman .................. H02J 7/0063 |

* cited by examiner

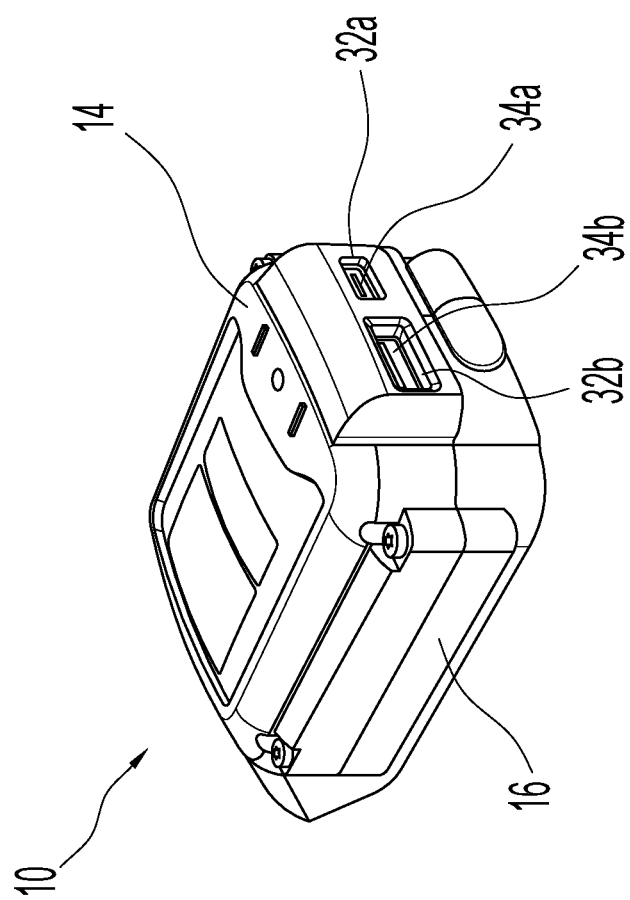

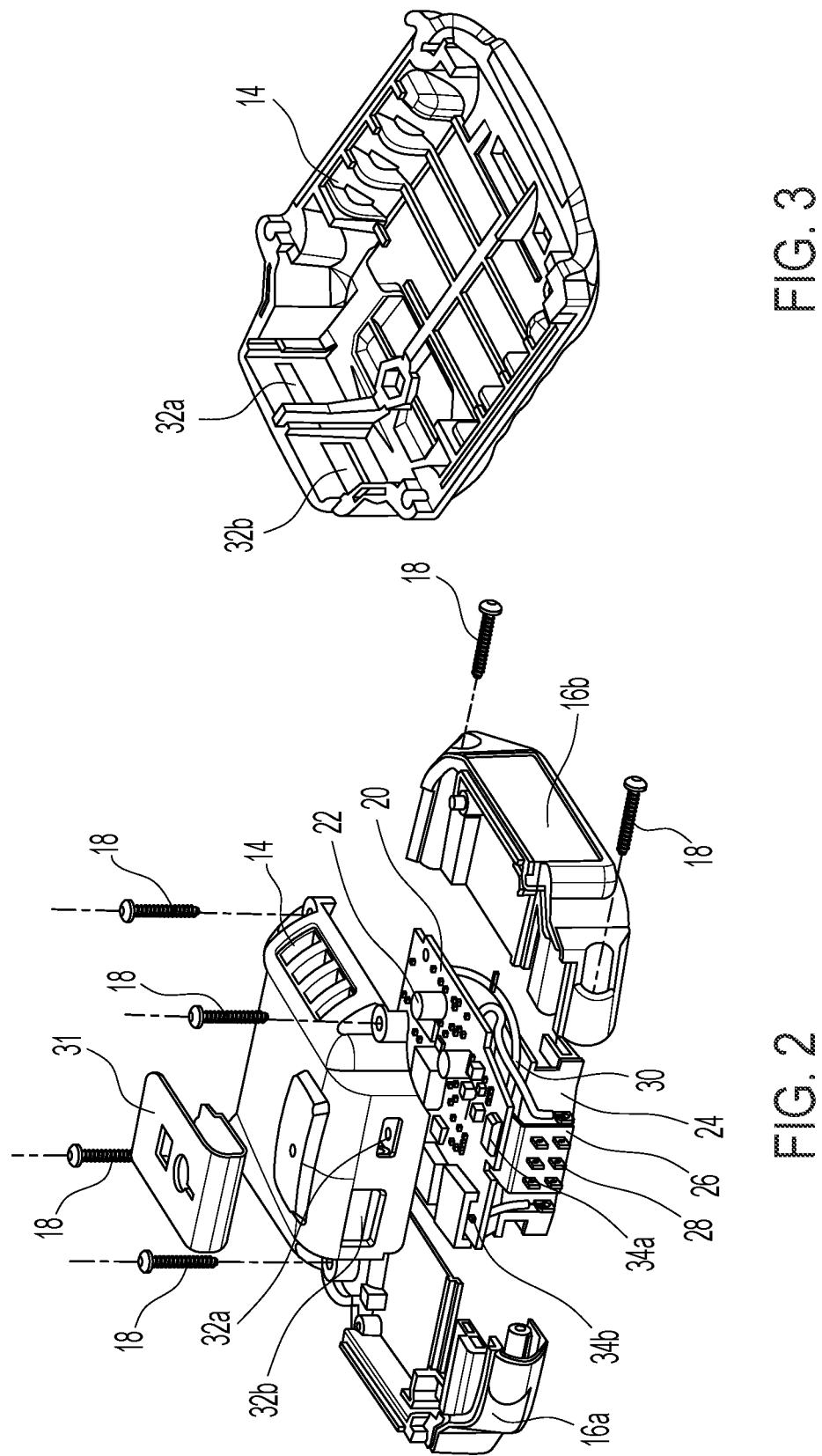

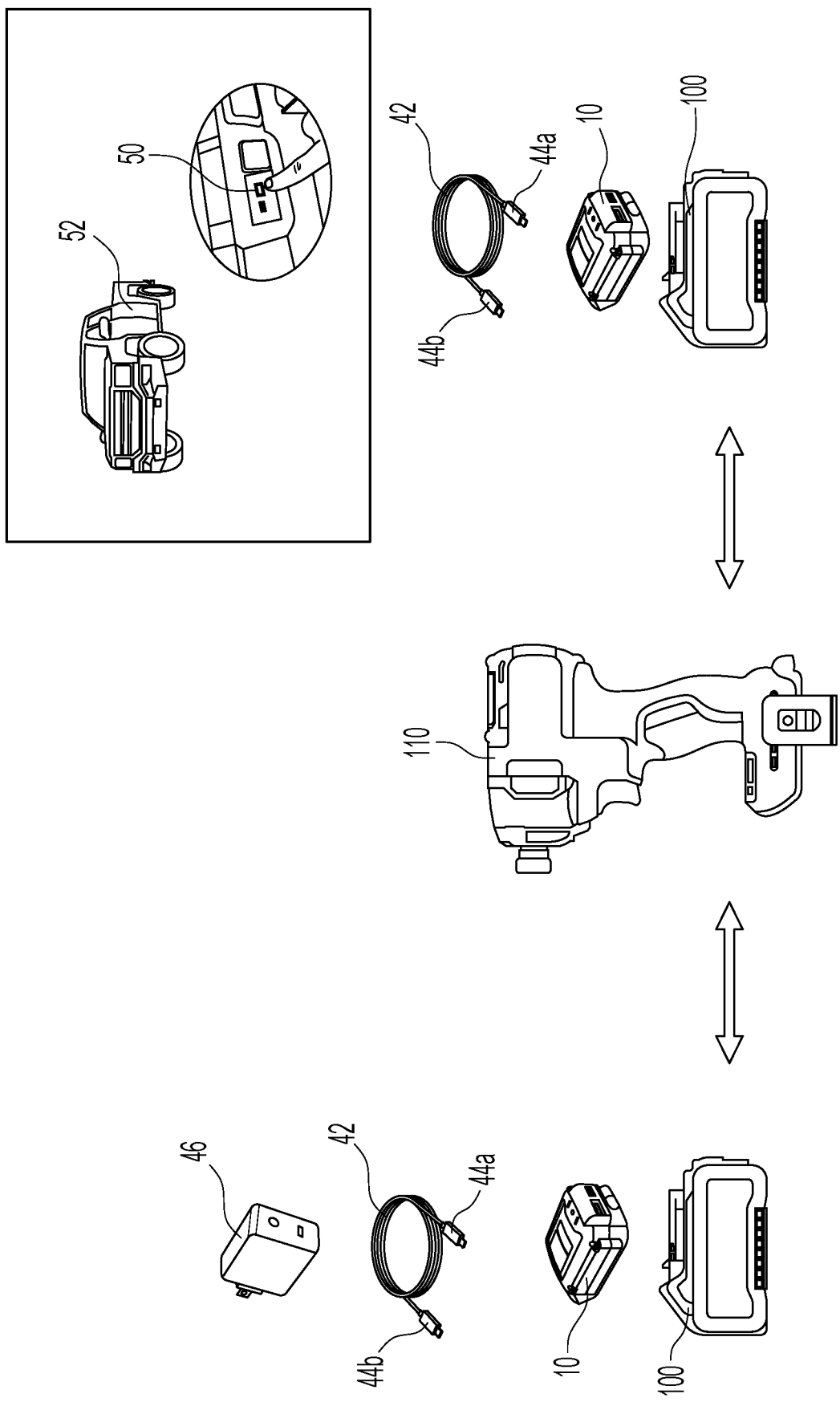

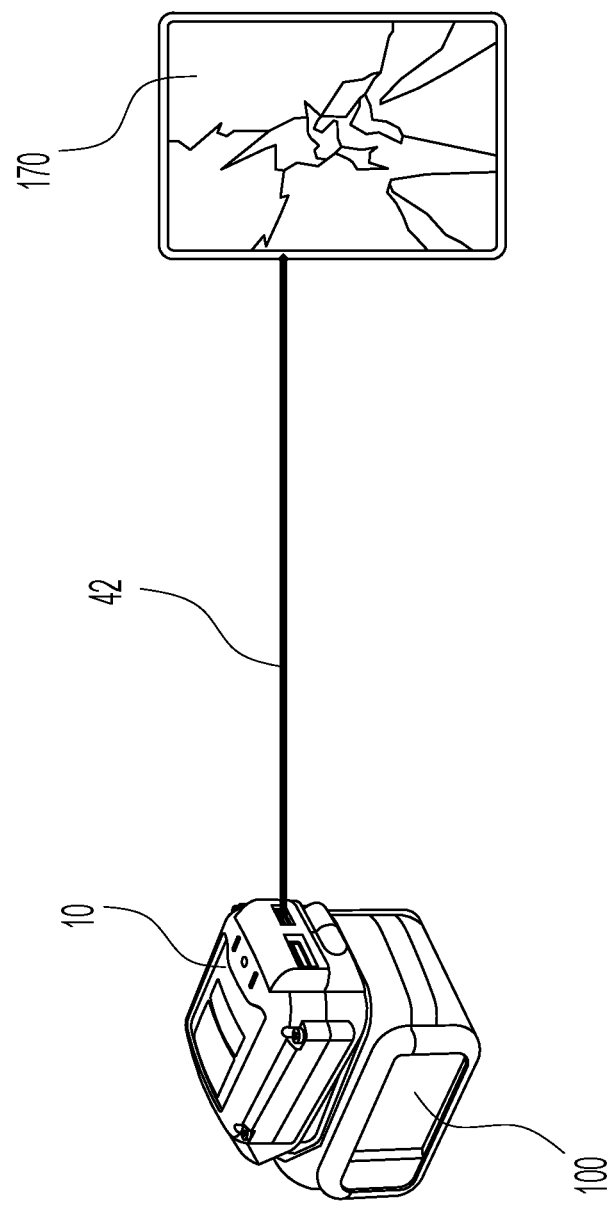

BATTERY PACK POWER TRANSFER ADAPTOR

RELATED APPLICATIONS

This application is a divisional application of and claims priority to U.S. patent application Ser. No. 17/237,929, filed on Apr. 22, 2021, titled, "Battery Pack Power Transfer Adaptor," which in turn claims priority under 35 U.S.C. § 119(e) to U.S. Provisional Patent Application No. 63/013, 909, filed Apr. 22, 2020, titled "Battery Pack Power Transfer Adaptor."

TECHNICAL FIELD

This application relates to a battery pack system and a method for transferring power to and/or from the battery pack. In one implementation, the system is configured to include an adaptor for transferring power to and/or from a device coupled to the battery pack through the adaptor.

BACKGROUND

Removable, rechargeable, secondary battery packs are becoming ubiquitous as more and more devices become wireless to take advantage of the advances in battery technology.

Such battery packs are commonly part of cordless power tool systems and are designed and configured to operate with a variety of cordless power tool, such as drills, circular saws and grinders, for example. The battery packs and the power tools include an interface system that enables the battery pack to couple to the power tool, as is well known in the art. Typically, these battery packs are charged using battery pack chargers that are designed and configured to charge specific battery packs. These chargers are designed and configured to plug into a wall outlet for access to alternating current (AC) mains line (utility) power or some other source of AC power, such as a generator. The ability to use the aforementioned battery packs to power unrelated devices, such as mobile phones or low power lights is also desirable.

There are adaptors that may be coupled to the rechargeable battery packs that enable the battery pack to provide power to such unrelated devices.

SUMMARY

The power transfer adaptor is both a tool and a charger designed to take advantage of USB 3.1's new PD (Power Delivery) specification. The feature includes the ability to supply bidirectional power up to 100 W. Because the adaptor is bidirectional, it will have many of the same properties of both a tool and a charger. For example, as a charger the adaptor can accept power up to 100 W from Type C source devices, incorporating legacy charger interfaces, standards & best practices. And for example, as a tool the adaptor can discharge a rechargeable battery pack to charge and power various devices through its Type C Port up to 100 W and through its Type A Port up to 12 W.

The adaptor leverages the Power Delivery (PD) or USB PD standard. The PD standard that allows devices to send or receive power through its Type C port (bidirectional power flow) up to 100 W and at varying voltage and current profiles. These products allow for discrete voltages of 5, 9, 12, 15, and 20V and currents up to 5 A. The PD standard uses a PD contract to establish a relationship between the PD device (the adaptor in this case) and a connected device. The contract is an agreement between two PD devices connected via Type C Cable. There are many nuances but the most basic constraints for each device are: (1) the source must establish and maintain the agreed upon voltage within +/−4% while sourcing all the way up to the agreed upon maximum current and (2) the sink may pull any amount of current from 0 A all the way up to the maximum agreed upon current. The current may not exceed the maximum for more than a few milliseconds.

A PD charger/provider/source is the device in the PD contract that agrees to send power to its partner device. A PD consumer/load/sink is the device in the PD Contract that agrees to accept power from its partner device. A PD dual role port (DRP) device is a device that is capable of being either a source or a sink depending on what is connecting to and its internal state. The adaptor is a DRP device.

The adaptor can provide cordless USB "C" power delivery limited only by the available battery packs, can choose a longer run time or shorter run time battery pack to customize a user experience, and can choose a larger or a smaller battery pack size based on ergonomic preferences.

These and other advantages and features will be apparent from the description and the drawings.

BRIEF DESCRIPTION OF THE DRAWINGS

FIG. 1 is an example embodiment of a power transfer adaptor.

FIG. 2 is an exploded view of the power transfer adaptor of FIG. 1.

FIG. 3 is an isometric view of an interior of a top housing of the power transfer adaptor of FIG. 1.

FIG. 4 is an example embodiment of a battery pack system including the power transfer adaptor of FIG. 1.

FIG. 11 is another example embodiment of a battery pack system including the power transfer adaptor of FIG. 1.

FIG. 23 is a rear, top, left-side isometric view of the battery pack of FIG. 16.

DETAILED DESCRIPTION

Figure 5:
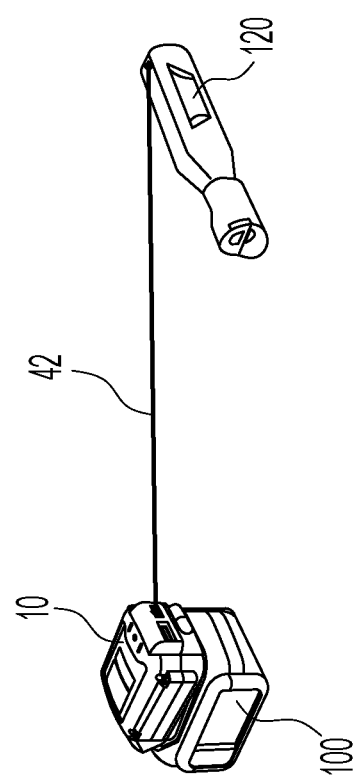
FIG. 5 is another example embodiment of a battery pack system including the power transfer adaptor of FIG. 1.

FIGS. 1-3 illustrate an example embodiment of a battery pack power transfer adaptor 10. The adaptor 10 may include a housing 12. The housing 12 may include an upper housing 14 and a lower housing 16. The lower housing 16 may include a first side housing 16a and a second side housing 16b. The upper housing 14 and the lower housings 16a, 16b may be coupled together by a plurality of fasteners 18, such as screws.

The upper housing 14 and the lower housing 16 form a cavity when coupled together. The adaptor 10 may include a variety of electrical and electronic components in the cavity. For example, the adaptor 10 may include a printed circuit board (PCB) 20 including a plurality of components 22, such as resistors, capacitors, connectors, integrated circuits, etc., mounted to the PCB 20. The adaptor 10 may also include a terminal block 24 in the cavity. The terminal block 24 may include a housing 26 and a plurality of adaptor terminals 28 fixedly positioned in the housing 26. The adaptor 10 may also include a plurality of wires 30 coupling one or more of the plurality of terminals 26 to the PCB 20. The adaptor 10 may also include a belt clip 31 coupled to the upper housing 14. The upper housing 14 may also include a plurality of connector openings 32a, 32b for providing access to connectors (ports) 34a, 34b coupled to the PCB 20. The adaptor may include a USB Type C port 34a and a USB Type A port 34b. In an alternate embodiment, the adaptor 10 may include a second USB Type C port instead of the USB Type A port. In another alternate embodiment, the adaptor 10 may include ports—either USB Type A, USB Type B or USB Type C—in addition to the two ports illustrated.

Generally, the adaptor 10 operates with a removable battery pack. This enables the adaptor 10 to provide power to a variety of products and devices from a variety of battery packs. The adaptor 10 is able to provide bi-directional power transfer with the detachable battery pack. The adaptor may include terminals 28 to voltage tap the plurality of battery cells in the detachable battery pack and provide access to the voltage tap values. The adaptor 10 includes an automatic sleep mode in response to an undervoltage condition, an idle condition, a no cable attached condition and for various fault conditions. The adaptor 10 may also include a wake-up feature for a cable insertion condition. The adaptor 10 includes a peak current control monitor circuit to ensure that the current into or out of the adaptor 10 does not exceed pre-established values.

FIG. 4 illustrates an example power tool and battery pack system. The system includes an example battery pack 100 and an example power tool 110. The removable battery pack 100 provides power to the power tool 110. As is well known in the art, the battery pack 100 and the power tool 110 include an interface system for coupling the battery pack 100 to the power tool 110. This example system uses a "slide" type interface system in which the battery pack 100 includes a set of rails and grooves and a latch to interface with a corresponding set of rails and grooves and a latch recess included on the power tool 110. Other types of interface systems, for example a "tower" type interface system could also be used. Once the battery pack 100 is coupled to the power tool 110, the battery pack 100 can supply power to the power tool 110 for operation of the power tool 110. Once the battery pack 100 is drained from operating the power tool 110, the battery pack 100 can be removed from the power tool 110 and coupled to the adaptor, as described below, to charge the battery pack 110.

The adaptor 10 includes interface features similar to the power tool 110 to enable the adaptor 10 to couple to the battery pack 100. For example, the adaptor 10 includes a set of rails 36 and a set of grooves 38 and a latch recess 40. The system may also include a bi-directional USB Type C cord 42 include a USB Type C male connector 44a, 44b at each end of the cord 42. The system may also include a plug-in power supply or rectifier 46 including a USB Type C port 48. In this system, one male connector 44a of the cord 42 plugs into the USB Type C port 34a of the adaptor 10 and one male connector 44b of the cord 42 plugs into the USB Type C port 48 of the power supply 46. The power supply 46 plugs into an outlet coupled to an AC power source, for example, a utility mains line or a portable generator. In this manner, the adaptor 10 is able to provide a charge to the battery pack 100 from the outlet.

Alternatively, the adaptor 10 may be coupled to a DC power source. Specifically, the male connector 44b of the USB Type C cord 42 may be coupled to a USB Type C port 50 in an automobile 52 to source power from a battery or alternator in the automobile 52.

FIG. 5 illustrates another example power tool and battery pack system. The system includes a battery pack 100, an adaptor 10, a bi-directional USB Type C cord 42, and a motorized electronic device 120. The battery pack 100, the adaptor 10, and the cord 42 are as described above. The motorized electronic device 120 includes a motor (not shown) and an application tool, for example a grinder. The device 120 includes a USB Type C port 122. The adaptor 10 couples to the battery pack 100. The cord 42 plugs into the USB Type C port of the adaptor 10 and into the USB Type C port of the device 120. The motorized electronic device 120 may (a) be without a battery and DC power from power transfer adaptor 10 drives the motor or (b) have a small battery inside the device 120 that runs the device 120 and the power transfer adaptor 10 charges the battery (either while in use or while idle—so device 120 could be operated either when connected to the adaptor 10, i.e., corded, or when not connected to the adaptor 10, i.e., cordlessly) or (c) have a battery which runs the DC motor and the power transfer adaptor 10 only charges the battery when the device 120 is not in use.

Figure 6:
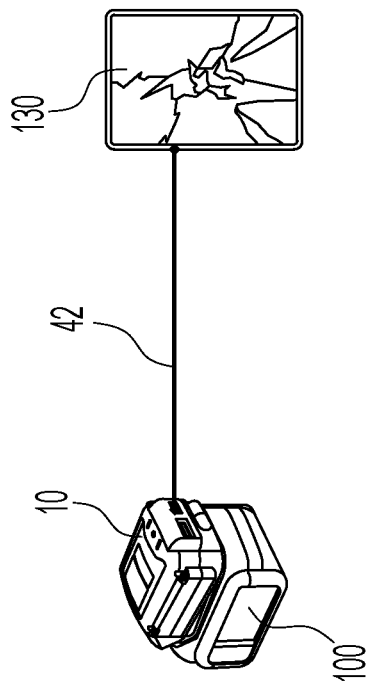
FIG. 6 is another example embodiment of a battery pack system including the power transfer adaptor of FIG. 1.

FIG. 6 illustrates an example computing device and battery pack system. The system includes a battery pack 100, an adaptor 10, a bi-directional USB Type C cord 42 and a computing device 130, for example a tablet computing device or a mobile phone. The battery pack 100, the adaptor 10, and the cord 42 are as described above. The computing device 130 includes a processor and other electrical and electronic components (not shown). The device 130 includes a USB Type C port 132. The adaptor 10 couples to the battery pack 100. The cord 42 plugs into the USB Type C port of the adaptor 10 and into the USB Type C port of the device 130. The computing device 130 may (a) be without a battery and DC power from power transfer adaptor 10 drives the processor and other electrical and electronic components or (b) have a small battery inside the device 130 that runs the device 130 and the power transfer adaptor 10 charges the battery (either while in use or while idle—so device 130 could be operated either when connected to the adaptor 10, i.e., corded, or when not connected to the adaptor 10, i.e., cordlessly) or (c) have a battery which runs the processor and other electrical and electronic components and the power transfer adaptor 10 only charges the battery when the device 130 is not in use.

Figure 7:
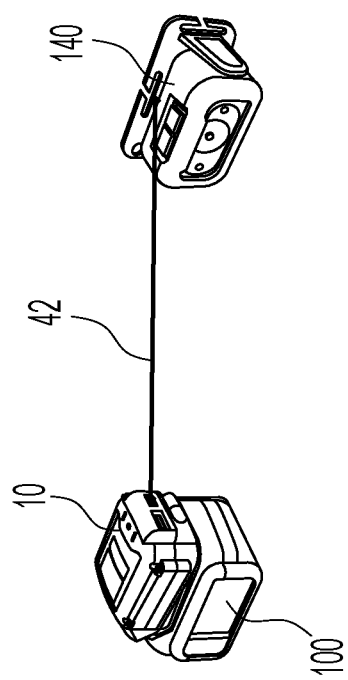
FIG. 7 is another example embodiment of a battery pack system including the power transfer adaptor of FIG. 1.

FIG. 7 illustrates an example non-motorized electronic device and battery pack system. The system includes a battery pack 100, an adaptor 10, a bi-directional USB Type C cord 42 and a non-motorized electronic device 140, for example a head lamp or a radio. The battery pack 100, the adaptor 10, and the cord 42 are as described above. The non-motorized electronic device 140 includes a load such as a light or an amplifier and other electrical and electronic components (not shown). The device 140 includes a USB Type C port 142. The adaptor 10 couples to the battery pack 100. The cord 42 plugs into the USB Type C port of the adaptor 10 and into the USB Type C port of the device 140. The non-motorized electronic device 140 may (a) be without a battery and DC power from power transfer adaptor 10 drives the light and other electrical and electronic components or (b) have a small battery inside the device 140 that runs the device 140 and the power transfer adaptor 10 charges the battery (either while in use or while idle—so device 140 could be operated either when connected to the adaptor 10, i.e., corded, or when not connected to the adaptor 10, i.e., cordlessly) or (c) have a battery which runs the light and other electrical and electronic components and the power transfer adaptor 10 only charges the battery when the device 140 is not in use.

Figure 8:
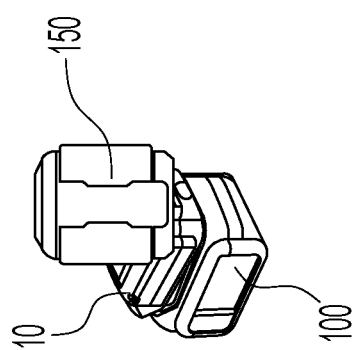
FIG. 8 is another example embodiment of a battery pack system including the power transfer adaptor of FIG. 1.

FIG. 8 illustrates another example battery pack system. The system includes a battery pack 100, an adaptor 10, and a motorized or a non-motorized electronic device 150, for example a fan or a wireless speaker. The battery pack 100 and the adaptor 10 are as described above. The motorized or non-motorized electronic device 150 includes a load such as a motor—in the case of a motorized device—or a speaker—in the case of a non-motorized device and other electrical and electronic components (not shown). The device 150 includes a USB Type C connector 152. The adaptor 10 couples to the battery pack 100. The device 152 plugs into the USB Type C port of the adaptor 10. The device 150 may be directly mountable onto the USB Type C port 32*a* of the adaptor 10 without a cord 42. The device 150 may include a set of rails and grooves or the weight of the device 150 secures the device 150 to the adaptor 10. The motorized or non-motorized electronic device 150 may (a) be without a battery and DC power from power transfer adaptor 10 drives the light and other electrical and electronic components or (b) have a small battery inside the device 150 that runs the device 150 and the power transfer adaptor 10 charges the battery (either while in use or while idle—so device 150 could be operated either when connected to the adaptor 10, i.e., corded, or when not connected to the adaptor 10, i.e., cordlessly) or (c) have a battery which runs the motor or speaker and other electrical and electronic components and the power transfer adaptor 10 only charges the battery when the device 150 is not in use.

Figure 9:
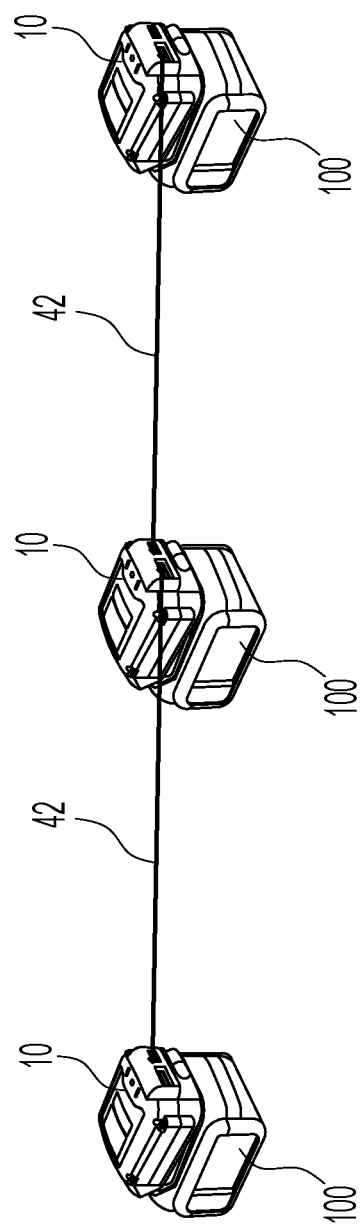
FIG. 9 is another example embodiment of a battery pack system including the power transfer adaptor of FIG. 1.

FIG. 9 illustrates another example battery pack system. This system includes a plurality of battery packs 100 and a plurality of adaptors 10 and a plurality of USB Type C cords 42. In this system, the adaptors 10 couple to the battery packs as described above. In a first embodiment, the adaptors 10 include a single USB Type C port 32*a*. As such, the first connector 44*a* of the cord 42 is coupled to the USB Type C port 32*a* of the first battery pack 100 and the second connector 44 of the cord 42 is coupled to the USB Type C port 32 of the second battery pack 100. In this configuration, the charge of the two battery packs 100 will be balanced between the two battery packs. In an alternate embodiment, the adaptor 10 includes two USB Type C ports. In such a configuration, more than two battery packs 100 can be daisy-chained together and a first battery pack in the line of battery packs 100 can be plugged into an AC power source—as illustrated in the system of FIG. 4—to provide power to all of the battery packs 100.

Figure 10:
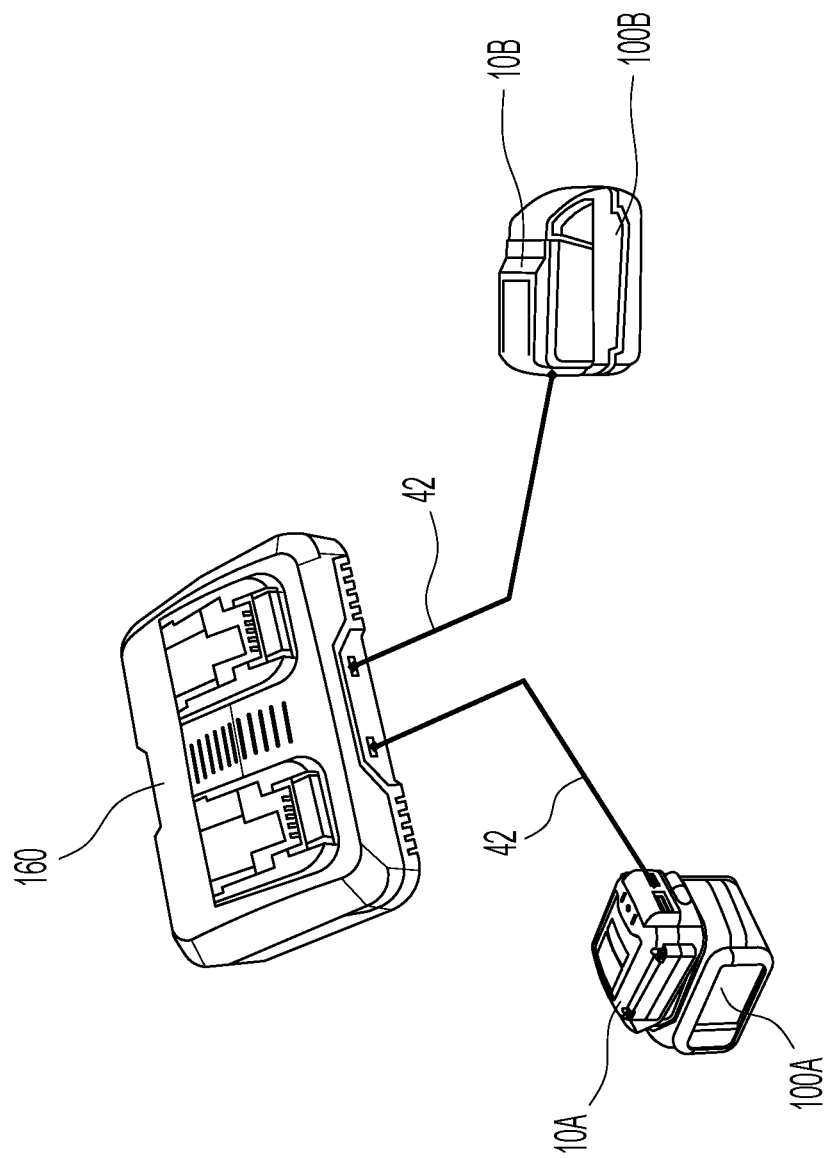
FIG. 10 is another example embodiment of a battery pack system including the power transfer adaptor of FIG. 1.

FIG. 10 illustrates another example battery pack system. This system includes a battery pack 100 of a first company A and an adaptor 10 designed and configured to couple to the Company A battery pack 100 and a battery pack 100 from a second company B and an adaptor 10 designed and configured to couple to the Company B battery pack 100. The system also includes a desktop charger 160. The charger 160 includes a pair of USB Type C ports. The charger is designed and configured to include a plug for coupling to a supply of AC power, as described above, and to provide charging power at both USB Type C ports. The system also includes a pair of bi-directional USB Type C cords 42. This system allows a variety of company battery packs 110A, 110B to be charged from the charger of one of the Company A or B or from another Company C. In this system, the first male connector 44*a* of the first cord 42 couples to the USB Type C port 32*a* of the Company A battery pack 100A and the second male connector 44*b* of the first cord 42 couples to a first USB Type C port of the desktop charger 160 and the first male connector 44*a* of the second cord 42 couples to the USB Type C Port 32*a* of the Company B battery pack 100B and the second male connector 44*b* of the second cord 42 couples to a second USB Type C port of the desktop charger 160. As such, the desktop charger 160 can provide a charging power to both the battery packs 100A, 100B, either serially or simultaneously.

FIG. 11 illustrates another example battery pack system. This system includes a battery pack 100, an adaptor 10, a cord 42 and a computing device 170 that includes a USB Type C port. The battery pack 100, the adaptor 10, the cord 42 and the computing device 170 couple as described above. In this example system, data regarding the battery pack may be transferred through the adaptor 10 via the USB Type C connection to the computing device 170. The computing device 170 may adjust the charging scheme from the battery pack 100 to the computing device 170. The computing device 170 may make these adjustments using an internal, self-operating software application or a user may make these adjustments using a user-driven application loaded on the computing device. The computing device 170 may transfer data or program code to the battery pack 100. Alternatively, the computing device 170 may include a diagnostic application. As such, when the computing device 170 is coupled to the adaptor 10 and the adaptor 10 is coupled to a battery pack 100 that has been returned to a manufacturer, the computing device can read diagnostic or data logging information regarding the health of the battery pack 100 and any information regarding any failures in the battery pack. A user can than use the computing device 170 to determine the cause underlying the failure of the battery pack 100.

Figure 12A:
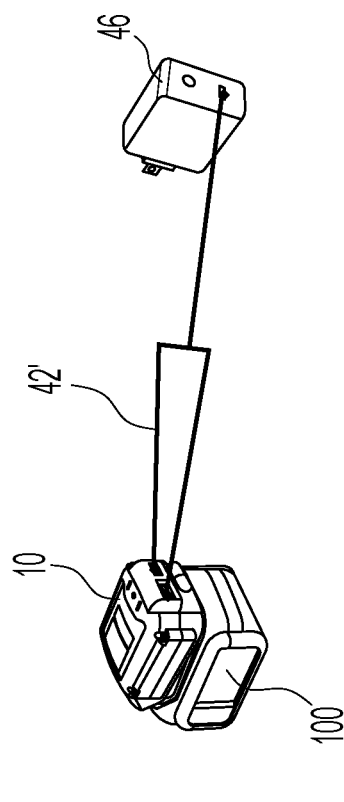
FIGS. 12a and 12b are additional example embodiments of a battery pack system including the power transfer adaptor of FIG. 1.

FIG. 12A illustrates another example battery pack system. This system includes a battery pack 100, an adaptor 10, two cords 42 and two power supplies 46. In this system the adaptor 10 includes two USB Type C ports. The first male connector 44a of the first cord 42 is plugged into the first USB Type C port of the adaptor 10 and the second male connector 44b of the first cord 42 is plugged into the USB Type C port of the first power supply 46. The first male connector 44a of the second cord 42 is plugged into the second USB Type C port of the adaptor 10 and the second male connector 44b of the second cord 42 is plugged into the USB Type C port of the second power supply 46. Both power supplies 46 are plugged into a source of AC power. In this system, the battery pack 100 is supplied two times as much power than if only a single power supply were coupled to the adaptor 10 and as such, the battery pack 100 can be charged twice as fast.

Figure 12B:
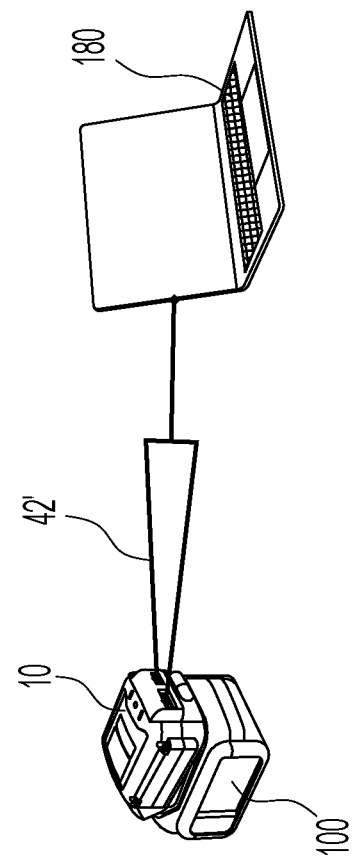

FIG. 12B illustrates another example battery pack system. This system includes a battery pack 100, an adaptor 10, a single cord 42' and a single power supply 46. In this system the adaptor 10 includes two USB Type C ports. The cord 42' includes three male connectors 44a, 44b, 44c. The first male connector 44a of the cord 42' is plugged into the first USB Type C port of the adaptor 10, the second male connector 44b of the cord 42' is plugged into the second USB Type C port of the adaptor 10 and the third male connector 44c of the cord 42' is plugged into the USB Type C port of the power supply 46. As the power supply 46 is able to provide power to two USB Type C ports on the adaptor 10 the battery pack 100 is supplied two times as much power than if only a single USB Type C port of the adaptor 10 were being used and as such, the battery pack 100 can be charged twice as fast.

Figure 13A:
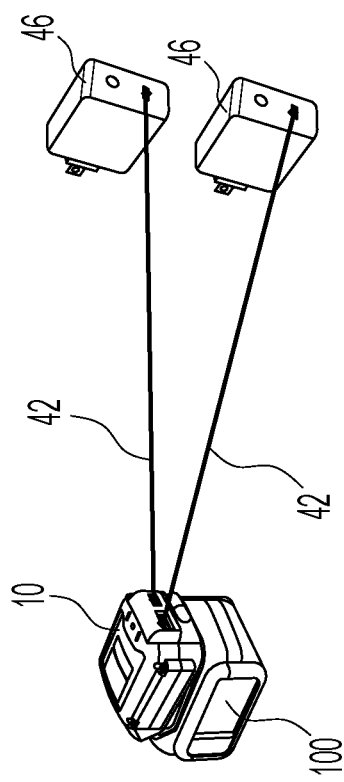
FIGS. 13a and 13b are additional example embodiments of a battery pack system including the power transfer adaptor of FIG. 1.

FIG. 13A illustrates another example battery pack system. This system includes a battery pack 100, an adaptor 10, two cords 42 and two computing devices 180, each with USB Type C ports. In this system the adaptor 10 includes two USB Type C ports. The first male connector 44a of the first cord 42 is plugged into the first USB Type C port of the adaptor 10 and the second male connector 44b of the first cord 42 is plugged into the USB Type C port of the first computing device 180. The first male connector 44a of the second cord 42 is plugged into the second USB Type C port of the adaptor 10 and the second male connector 44b of the second cord 42 is plugged into the USB Type C port of the second computing device 180. In this system, the battery pack 100 is able to supply charging power to two computing devices 180 and charge them both simultaneously.

Figure 13B:
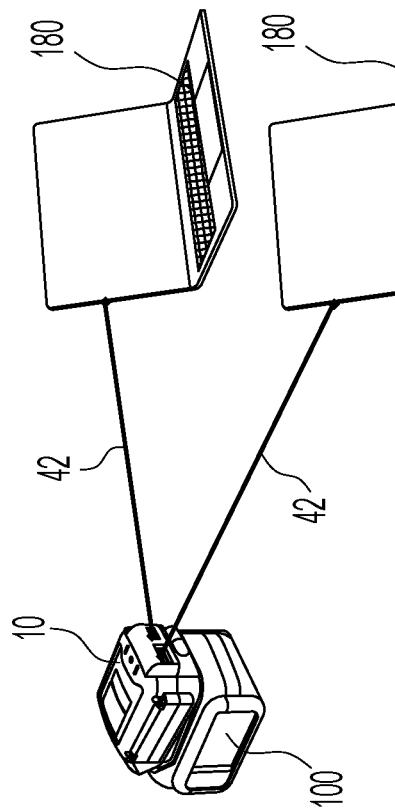

FIG. 13B illustrates another example battery pack system. This system includes a battery pack 100, an adaptor 10, a single cord 42' and a computing device 180 with a USB Type C port. In this system the adaptor 10 includes two USB Type C ports. The cord 42' includes three male connectors 44a, 44b, 44c. The first male connector 44a of the cord 42' is plugged into the first USB Type C port of the adaptor 10, the second male connector 44b of the cord 42' is plugged into the second USB Type C port of the adaptor 10 and the third male connector 44c of the cord 42' is plugged into the USB Type C port of the computing device 180. As the battery pack 100 is able to provide twice as much charging power to the computing device 180 through two USB Type C ports of the adaptor 10 the computing device 180 is supplied two times as much power than if only a single USB Type C port of the adaptor 10 were being used and as such, the computing device 180 can be charged twice as fast.

Figure 14:
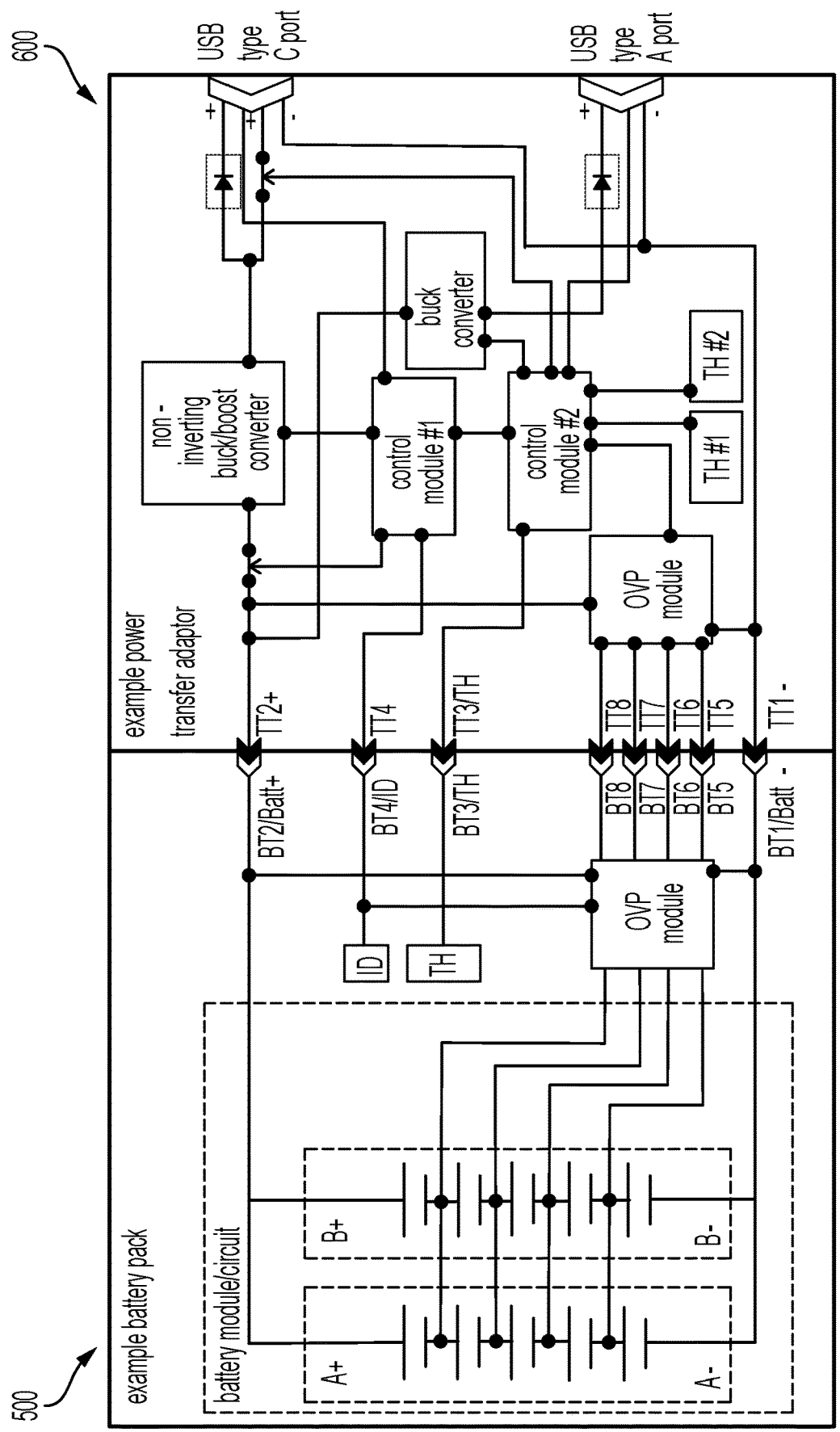
FIG. 14 is a simplified schematic circuit diagram of an example battery pack coupled to an example power transfer adaptor.
Figure 15:
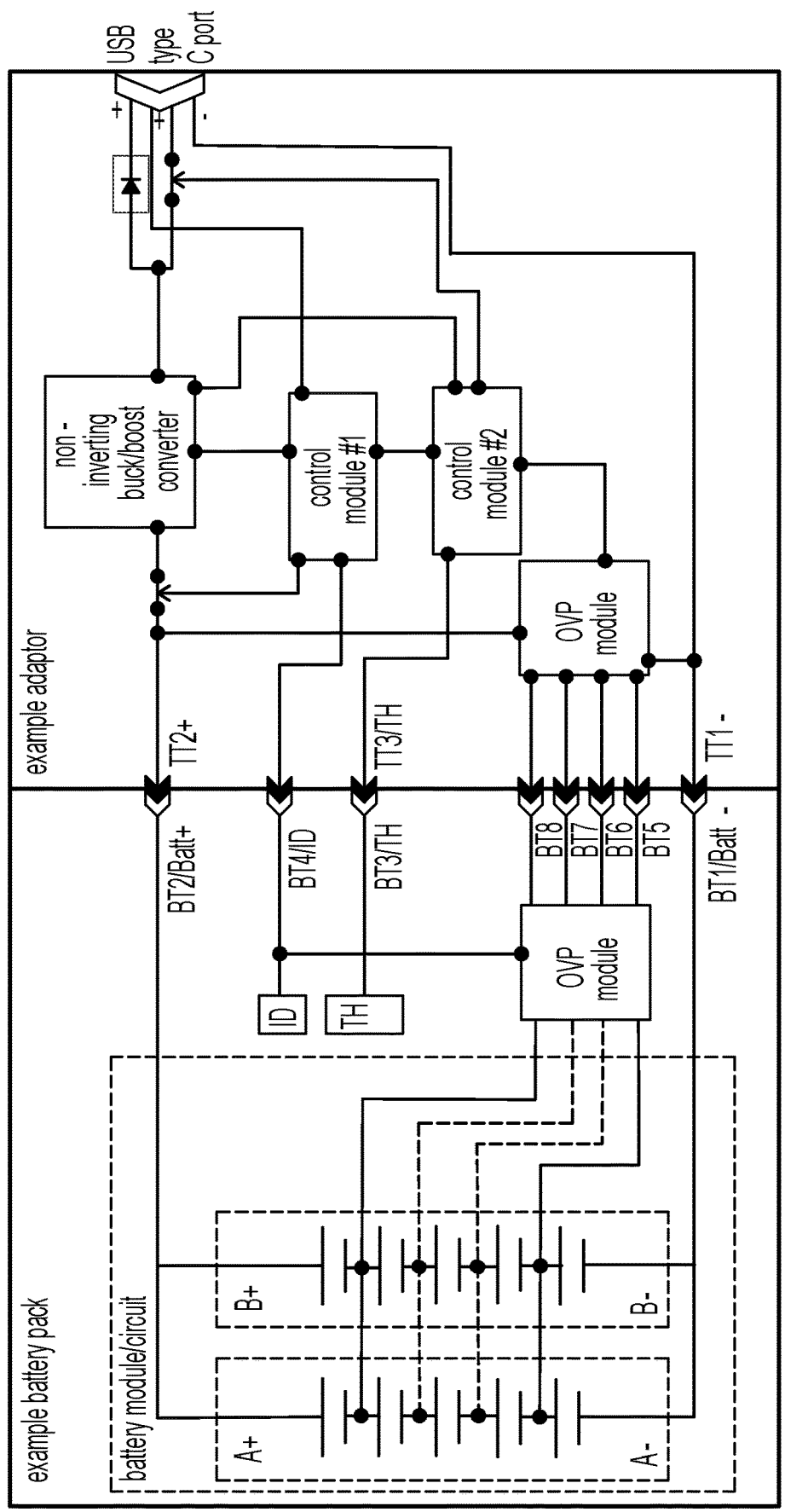
FIG. 15 is a simplified schematic circuit diagram of an example battery pack coupled to an example power transfer adaptor.
Figure 17:
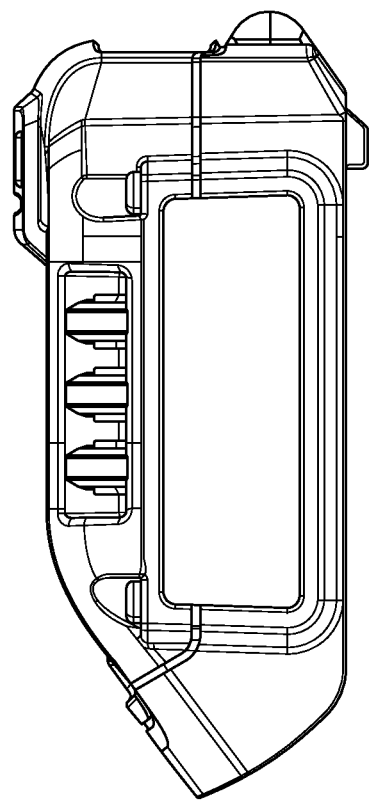
FIG. 17 is a right, side elevation view of the battery pack of FIG. 16.
Figure 16:
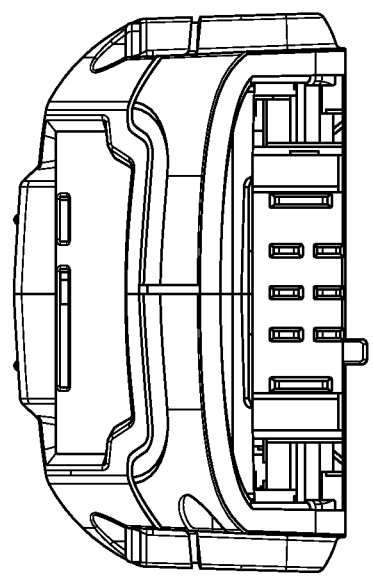
FIG. 16 is a front elevation view of a battery pack of the present invention.
Figure 19:
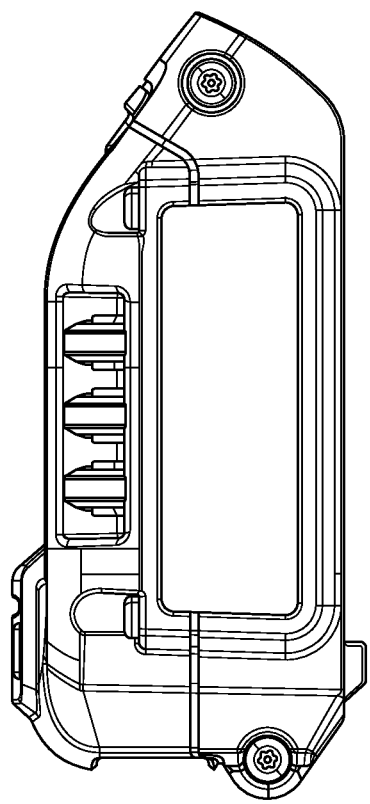
FIG. 19 is a left, side elevation view of the battery pack of FIG. 16.
Figure 18:
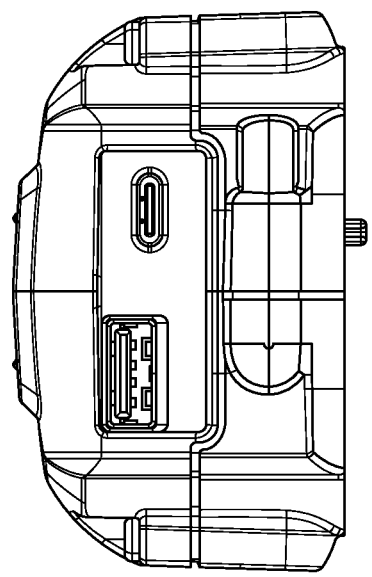
FIG. 18 is a rear elevation view of the battery pack of FIG. 16.
Figure 21:
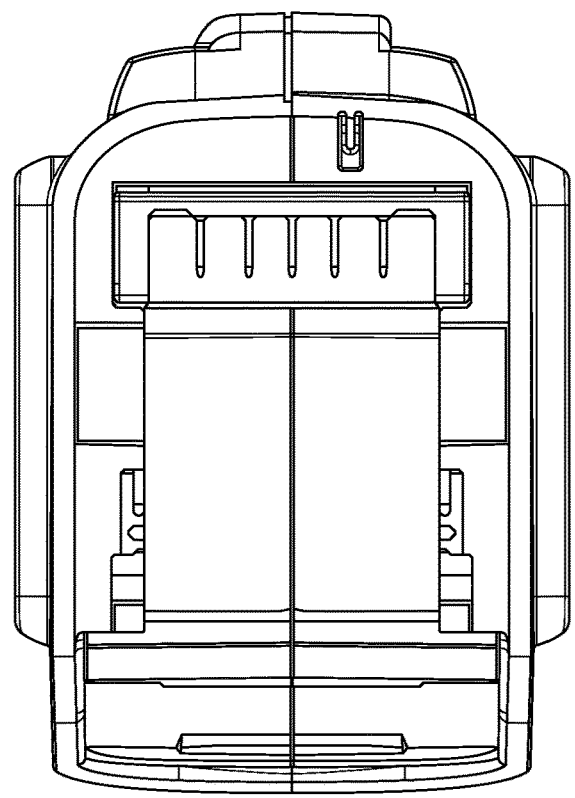
FIG. 21 is a bottom plan view of the battery pack of FIG. 16.
Figure 20:
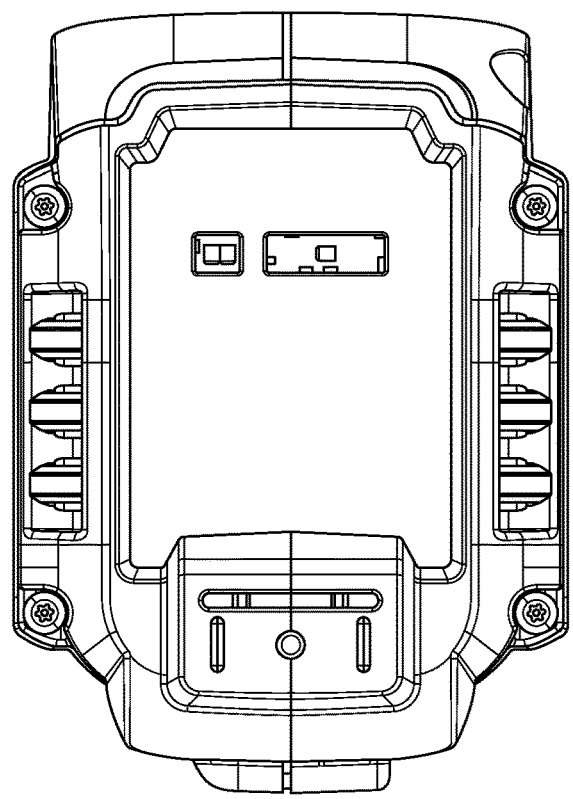
FIG. 20 is a top plan view of the battery pack of FIG. 16.
Figure 23:
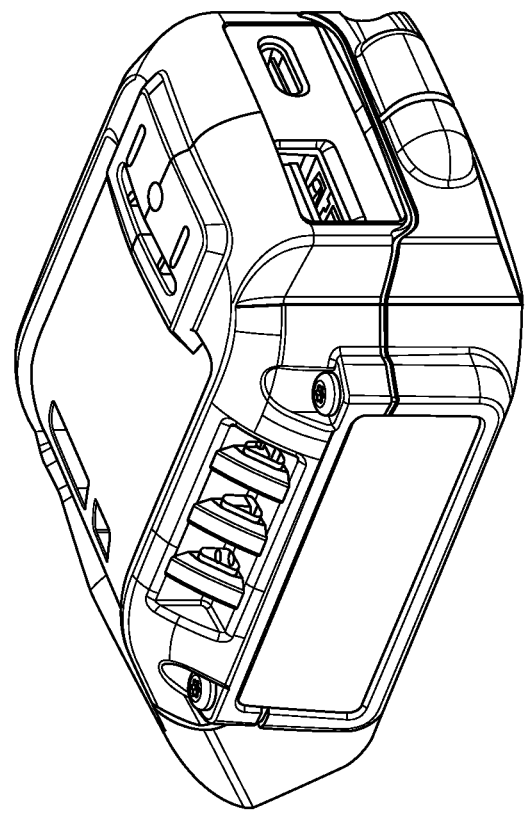
FIG. 23 is a rear, top, right-side isometric view of the battery pack of FIG. 16.
Figure 22:
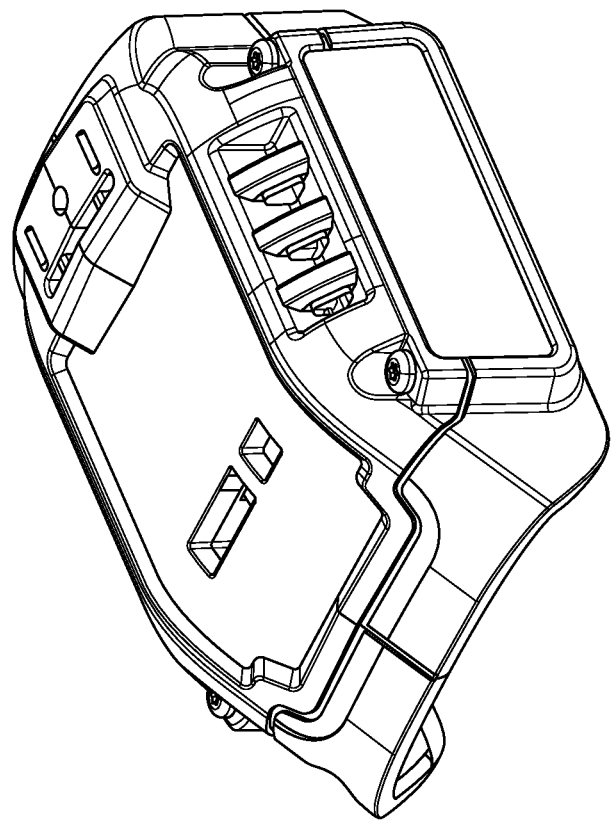
FIG. 22 is a front, top, right-side isometric view of the battery pack of FIG. 16.
Figure 25:
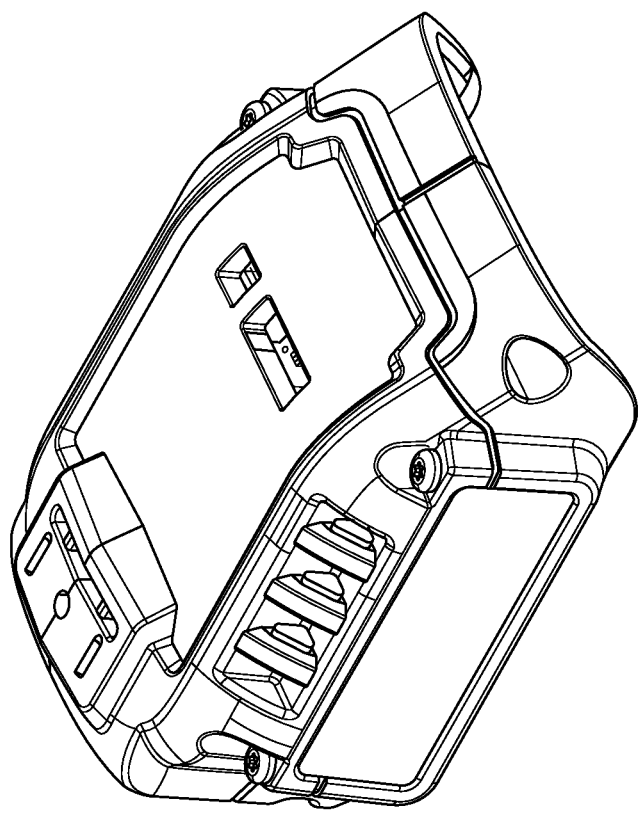
FIG. 25 is a front, top, left-side isometric view of the battery pack of FIG. 16.
Figure 24:
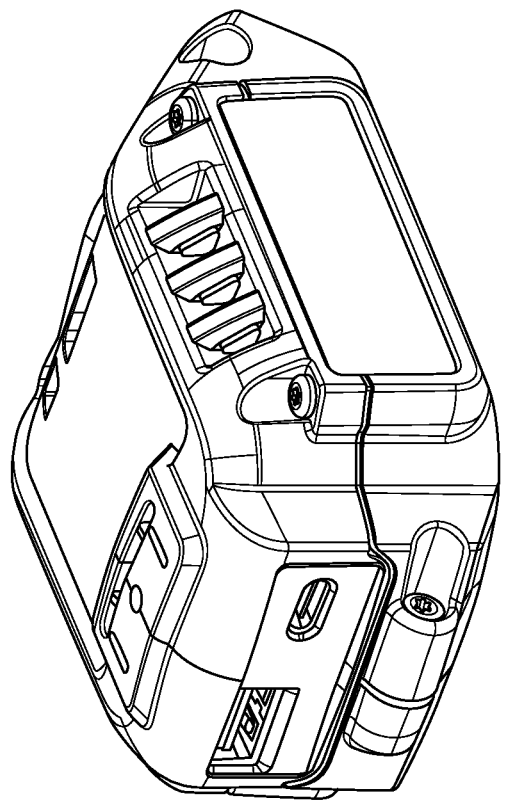
FIG. 24 is a rear, top, right-side isometric view of the battery pack of FIG. 16.
Figure 27:
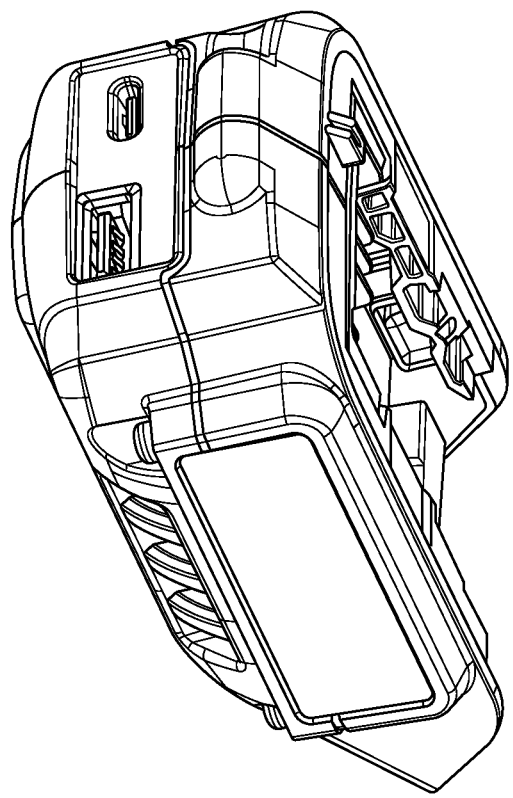
FIG. 27 is a rear, bottom, right-side isometric view of the battery pack of FIG. 16.
Figure 26:
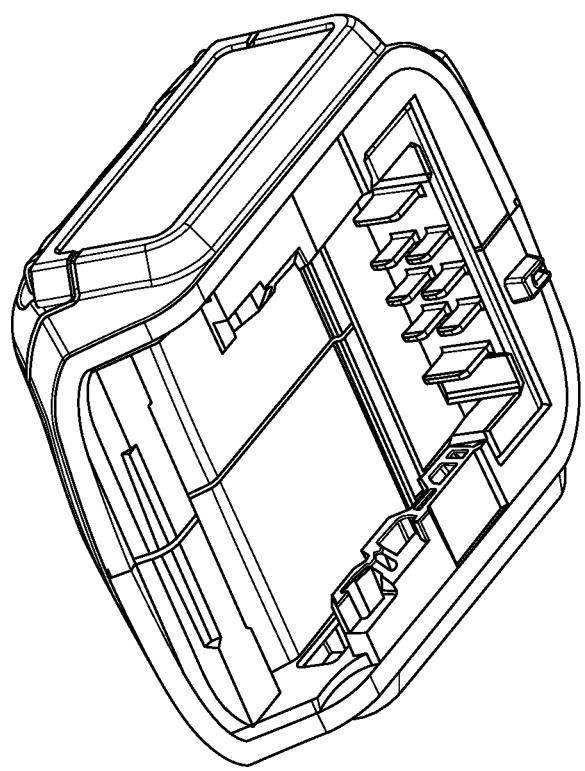
FIG. 26 is a front, bottom, right-side isometric view of the battery pack of FIG. 16.
Figure 29:
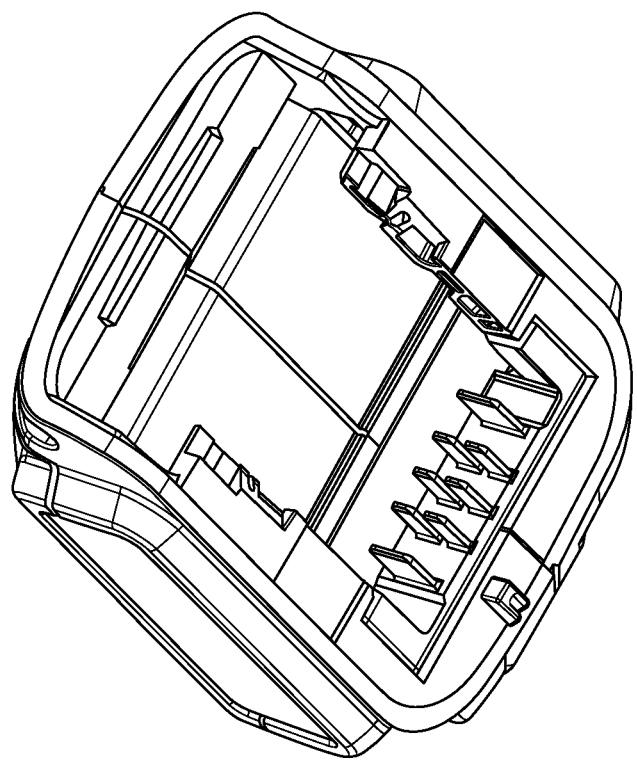
FIG. 29 is a front, bottom, left-side isometric view of the battery pack of FIG. 16.
Figure 28:
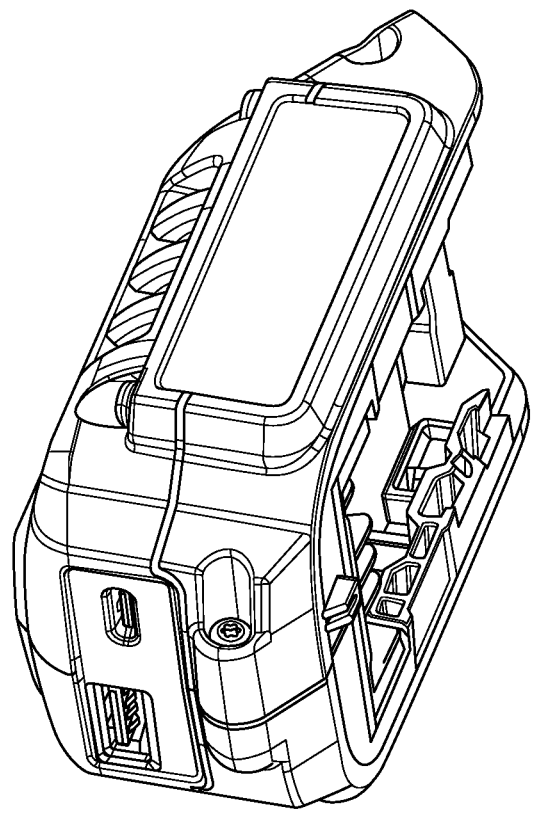
FIG. 28 is a rear, bottom, left-side isometric view of the battery pack of FIG. 16.

FIG. 14 illustrates a simplified schematic circuit diagram of an example battery pack 500 coupled to an example power transfer adaptor 600. The example battery pack 500 includes a battery module (sometimes also referred to as a battery circuit) 510. The battery module 510 includes, among other components not illustrated for purposes of simplicity but understood to those of ordinary skill in the art, a plurality of battery cells 520. The battery cells 520 are coupled together in a first string of battery cells 530A (sometimes also referred to as a set of battery cells) and a second string of battery cells 530B. Each string of battery cells 530A, 530B includes five battery cells connected in series. In alternate embodiments, the strings of battery cells may have fewer or more battery cells. Each string of battery cells 530A, 530B includes a positive node A+, B+, respectively and a negative node A−, B−, respectively. The battery pack 500 also includes a plurality of battery pack terminals BT1-BT8 (sometimes also referred to as a set of battery pack terminals). The set of battery pack terminals includes a first subset of battery pack terminals BT1 and BT2 that serve as power terminals for transferring power to charge the battery cells or power to operate a device coupled to the battery pack, either directly or through an adaptor 600. The set of battery pack terminals may also include a second subset of battery pack terminals BT3-BT8. The second subset of battery pack terminals BT3-BT8 serve as signal or data terminals for transferring low current, signals to indicate various pieces of data regarding the battery pack. The battery pack also includes an overvoltage protection (OVP) module (sometimes referred to as a circuit or controller). The OVP module includes a connection to a node between adjacent battery cells. In this manner, the OVP module can determine if a charge on each of the battery cells exceeds an overvoltage threshold. The OVP module is also coupled to the BT4 signal terminal. If one of the plurality of battery cells exceeds the overvoltage threshold, the OVP module outputs a signal to the BT4 signal terminal. The battery pack 500 also includes an identification circuit (ID). The ID circuit is connected to the BT4 signal terminal. The ID circuit includes various components, for example resistors and/or capacitors, coupled between a voltage and a ground reference. The values of the resistors and/or capacitors determine the voltage value that is place on the BT4 signal terminal and are indicative of various characteristics of the battery pack, for example, its chemistry, capacity, cell type, etc. The battery pack 500 also includes a thermistor circuit (TH). The TH circuit is connected to the BT3 signal terminal. The TH circuit includes various components, for example a thermistor, resistors and/or capacitors coupled between a voltage and a ground reference. The thermistor monitors the temperature of the battery cells. If the temperature of one or more of the battery cells exceed a temperature threshold, a signal is placed on the BT3 terminal. The values of the capacitor(s) in the TH circuit may also indicate various characteristics of the battery pack, for example, the number of strings of battery cells in the battery pack. In this example battery pack, the strings of battery cells 530A, 530B are connected together in parallel. As such, the A+ node and the B+ node are both connected to the BT2 power terminal and the A− node and the B− node are both connected to the BT1 power terminal.

The adaptor 600 includes a plurality of terminals TT1-TT8 (sometimes referred to as a set of terminals). The set of adaptor terminals includes a first subset of adaptor terminals TT1 (negative power terminal) and TT2 (positive power terminal) that serve as power terminals for transferring power to charge or discharge the battery cells of a battery pack coupled to the adaptor 600. The set of adaptor terminals may also include a second subset of adaptor terminals TT3-TT8. The second subset of adaptor terminals TT3-TT8 serve as signal or data terminals for transferring low current, signals to indicate various pieces of data regarding an attached battery pack 500. The adaptor 600 may include a first USB type C port. The adaptor 600 may include a first USB type A port. In alternate embodiments, the adaptor 600 may include a second USB type C port instead of the USB type A port. The USB type C port may include a first positive node, a second positive node, a negative node and data node. These nodes may be formed as terminals or pins on the port. The adaptor 600 may include an ideal diode coupled to the first positive node of the type C port. The adaptor 600 may include a controllable switch coupled to the second positive node of the type C port. The first positive node and the second positive node of the type C port are coupled to the positive power terminal TT2 and the negative node of the type C port is coupled to the negative power terminal TT1.

The adaptor 600 may include a first control module (sometimes also referred to as a control circuit or a controller or a microcontroller or control circuitry) and a second control module (sometimes also referred to as a control circuit or a controller or a microcontroller or control circuitry). The adaptor 600 may include a bi-directional non-inverting buck/boost converter coupled between the positive power terminal TT2 and the first and the second positive nodes of the type C port. The buck/boost converter may be coupled to the first control module. The adaptor may include battery disconnect switch coupled between the buck/boost converter and the positive power terminal TT2. The USB type A port may include a positive node, a negative node and data node. These nodes may be formed as terminals or pins on the port. The adaptor 600 may include an ideal diode coupled to the first positive node of the type A port. The adaptor 600 may include a buck converter coupled between the positive power terminal TT2 and the positive node of the type A port. The buck converter may be coupled to the second control module. The adaptor may include a OVP module coupled to the adaptor power terminals TT1, TT2 and to the adaptor signal terminals TT5-TT8. The OVP module may be coupled to the second control module. The adaptor 600 may include a first thermistor circuit and a second thermistor circuit to monitor the temperature of the adaptor 600 and its components. The first and second thermistor circuits may be coupled to the second control module.

The first control module may be coupled to the battery disconnect switch to control the battery disconnect switch based on various signals received by the first control module. The first control module may be connected to the TT4 signal terminal. The second control module may be connected to the TT3 signal terminal. The second control module may be coupled to the control switch coupled to the second positive node of the type C port. The second control module may control the control switch coupled to the second positive node of the type C port based upon one or more signals received by the second control module.

After a user inserts a source into the adaptor Type C port, the adaptor performs a negotiation with the partner device. When negotiation is complete, a PD contract is established wherein the partner device Type C source is obligated to provide the contract voltage and our unit is obligated to not exceed the agreed upon maximum current level. Typical voltage and current levels are as follows:

| Voltage Level | Current |
| --- | --- |
| 5 V | 1 A, 1.5 A, 3 A |
| 9 V | 1 A, 1.5 A, 3 A |
| 12 V | 1 A, 1.5 A, 3 A |
| 15 V | 1 A, 1.5 A, 3 A |
| 20 V | 1 A, 1.5 A, 3 A, 5 A |

The adaptor can read the PD contract information and adapt its current intake accordingly.

Current Level Selection

When selecting a current level for charging, the adaptor will consider and comply with: the partner device (charger's) maximum current output level (Ibus limit) and the battery's maximum safe allowable current level (Ibat limit). The adaptor's software is perpetually monitoring both the PD/Type C activity to determine the Ibus limit and battery/ambient conditions to determine the Ibat limit.

Partner Device & Ibus Limit

As mentioned above, the adaptor will attempt to pull current commensurate with the maximum current the partner device can supply minus about 5%. This ensures we minimize charge time but do not exceed the PD contract conditions.

Pack ID Limits

The adaptor reads and considers both the ID Resistor (ID line to ground) and the ID Capacitor (NTC line to ground) of the battery pack with independent microcontrollers and chooses the lower of the two values to select the maximum amount of current the battery pack can take when charging the battery pack.

Charger NTC & Thermal Foldback

In order to prevent the adaptor from overheating, there is a thermal foldback routine. To do this we read the two on-board NTCs and adjust the battery current accordingly. The routine is as follows: at 115° C. we reduce the maximum allowable battery current from 4 A or higher to 2 A maximum, at 95° C. we re-allow the maximum current to be 4 A or higher (pack dependent), at 125° C. we disallow current flow entirely, at 120° C. we re-allow current flow of 2 A.

Pack NTC Limitations

In order to protect the attached battery and comply with charging schemes for the attached battery pack, the adaptor must react to the pack NTC conditions as follows: below 0° C., allow 0 A charging, between 0° C. and 10° C., allow 2 A maximum charging, above 60° C. allow 0 A charging; each options including a few degrees of hysteresis.

Over-Voltage Protection Reset Limits & Topping Off

The adaptor uses top-off "step down" charging schemes similar to charger. The rule base is as follows: for bulk charge (0 OVP trips) pull the maximum amount of current allowed by all the other rules (CNTC, Pack, Ibus, Pack ID); after 1 OVP Reset: set the limit to 2 A; after 2 OVP Resets: set the limit to 1 A. For all subsequent resets, set the limit to 300 mA as a maintenance charge. However, if a Type A device is attached, the minimum current will be 2 A instead of 300 mA in order to ensure that adaptor charges the attached battery pack at a rate that is faster than the Type A discharge rate.

Type C Sourcing/Discharging

After a user inserts a sink into the adaptor Type C port, the adaptor performs a contract negotiation with the partner device. When the contract negotiation is complete, a PD contract is established wherein the partner device Type C sink is obligated to pull less than the PD contract maximum current and the adaptor is obligated to provide the requested voltage within +/−5%. If the battery pack NTC reading indicates a reading greater than 70° C. the adaptor will not allow discharge through the Type C port. If one of the adaptor NTCs detects a temperature greater than 120° C. the adaptor will not allow discharge through the Type C port. If the adaptor detects a stack voltage of <15 V it will cease to allow discharge on the Type C port. The adaptor will only re-enable discharge once the stack voltage exceeds 17.8 V.

Type A Sourcing/Discharging

After a user inserts a Type A device into the Type A port of the adaptor, the adaptor detects the presence of a load and turns on the Type A bus within ~1 s. If the adaptor temperature or the battery pack temperature falls below −20° C. the adaptor will stop current flow through the Type A port. If the adaptor detects a stack voltage of <15 V it will stop discharge on the Type A port. The adaptor will only re-enable discharge once the stack voltage exceeds 15.5 V. The Type A bus will remain on for at least 8 hours. At that point the adaptor checks whether a device is still inserted. If a device is still inserted to the Type A port, the adaptor keeps the bus on. If a device is not still inserted to the Type A port, then the adaptor turns off the Type A port.

Numerous modifications may be made to the exemplary implementations described above. These and other implementations are within the scope of this application.

The invention claimed is:

1. A battery pack power transfer adaptor, comprising:
a USB type C port;
a set of power terminals including a positive power terminal and a negative power terminal, the set of power terminals configured to mate with a rechargeable battery pack for transferring power to and from the battery pack;
the positive power terminal coupled to the USB type C port at a first node and at a second node of the type C port and the negative power terminal coupled to the USB type C port at a third node;
a first control module and a second control module; and
a bi-directional non-inverting buck/boost converter coupled between the positive power terminal and the first and the second node of the type C port.

2. The battery pack power transfer adaptor, as recited in claim 1, further comprising an overvoltage protection module coupled to the adaptor positive power terminal and the adaptor negative power terminal and to a plurality of adaptor signal terminals.

3. The battery pack power transfer adaptor, as recited in claim 2, wherein the overvoltage protection module is coupled to the second control module.

4. The battery pack power transfer adaptor, as recited in claim 1, further comprising a first thermistor circuit and a second thermistor circuit to monitor the temperature of the adaptor and its components.

5. The battery pack power transfer adaptor, as recited in claim 4, wherein the first and second thermistor circuits are coupled to the second control module.

6. The battery pack power transfer adaptor, as recited in claim 1, wherein the buck/boost converter is coupled to the first control module.

7. The battery pack power transfer adaptor, as recited in claim 1, further comprising a battery disconnect switch coupled between the buck/boost converter and the positive power terminal.

8. The battery pack power transfer adaptor, as recited in claim 1, further comprising a USB type A port, the USB type A port including a positive node, a negative node and data node formed as terminals on the port.

9. The battery pack power transfer adaptor, as recited in claim 8, further comprising a buck converter coupled between the positive power terminal and the positive node of the type A port.

10. The battery pack power transfer adaptor, as recited in claim 9, wherein the buck converter is coupled to the second control module.

* * * * *